United States Patent
Maor et al.

(10) Patent No.: US 10,803,074 B2
(45) Date of Patent: Oct. 13, 2020

(54) EVALUATING SYSTEM BEHAVIOUR (71) Applicant: Hewlett Packard Enterprise Development LP, Houston, TX (US)

(72) Inventors: Alina Maor, Haifa (IL); Renato Keshet, Haifa (IL); Ron Maurer, Haifa (IL); Yaniv Sabo, Haifa (IL)

(73) Assignee: Hewlett Packard Entperprise Development LP, Houston, TX (US)

( * ) Notice: Subject to any disclaimer, the term of this patent is extended or adjusted under 35 U.S.C. 154(b) by 286 days.

(21) Appl. No.: 15/750,587

(22) PCT Filed: Aug. 10, 2015

(86) PCT No.: PCT/US2015/044478
§ 371 (c)(1),
(2) Date: Feb. 6, 2018

(87) PCT Pub. No.: WO2017/027003
PCT Pub. Date: Feb. 16, 2017

(65) Prior Publication Data
US 2019/0012351 A1    Jan. 10, 2019

(51) Int. Cl.
*G06F 16/00* (2019.01)
*G06F 16/2458* (2019.01)
(Continued)

(52) U.S. Cl.
CPC .... *G06F 16/2462* (2019.01); *G06F 16/24578* (2019.01); *G06F 16/285* (2019.01);
(Continued)

(58) Field of Classification Search
CPC .. G06F 16/2462; G06F 16/285; G06F 16/288; G06F 16/24578; G06F 16/00; G06F 17/18; G06F 17/30; G06F 21/00; G06F 21/552; G06F 7/20; G06F 21/60; G06F 21/602; G06F 16/248; G06F 16/252;
(Continued)

(56) References Cited

U.S. PATENT DOCUMENTS 7,310,590 B1   12/2007 Bansal
7,519,860 B2   4/2009 Haetoenen et al.
(Continued)

FOREIGN PATENT DOCUMENTS

CN   103220343 A   7/2013
EP   1622044 A1   2/2006
(Continued)

OTHER PUBLICATIONS

Xudong Zhu, Hui Li; "Activity Clustering for Anomaly Detection"; Sep. 2013; http://dl.acm.org/citation.cfm?id=2528344.
(Continued)

*Primary Examiner* — Anh Ly
(74) *Attorney, Agent, or Firm* — Hewlett Packard Enterprise Patent Department (57) ABSTRACT

The present disclosure provides a method, system and non-transient computer readable medium for evaluating system behaviour by deriving a statistical distance between each entity in a multi-entity system, and summing the statistical distance to each other entity to create a ranked abnormality score for each entity in the system.

13 Claims, 7 Drawing Sheets

(51) Int. Cl.
  *G06F 16/28* (2019.01)
  *G06F 21/00* (2013.01)
  *G06F 21/55* (2013.01)
  *G06N 7/00* (2006.01)
  *G06N 20/00* (2019.01)
  *G06F 16/2457* (2019.01)
  *G06F 17/18* (2006.01)

(52) U.S. Cl.
  CPC ............ *G06F 16/288* (2019.01); *G06F 17/18* (2013.01); *G06F 21/00* (2013.01); *G06F 21/552* (2013.01); *G06N 7/005* (2013.01); *G06N 20/00* (2019.01)

(58) Field of Classification Search
  CPC .... G06F 16/2455; G06Q 10/04; G06N 20/00; G06N 7/005; G06K 9/00127; G16B 40/00
  See application file for complete search history.

(56) References Cited

U.S. PATENT DOCUMENTS

| | | | |
|---|---|---|---|
| 7,689,455 | B2 | 3/2010 | Fligler et al. |
| 7,716,169 | B2 | 5/2010 | Park et al. |
| 7,899,762 | B2* | 3/2011 | Iyengar ................. G06Q 10/00 706/12 |
| 7,991,726 | B2 | 8/2011 | Zhou et al. |
| 8,005,767 | B1 | 8/2011 | Cassella |
| 8,028,337 | B1* | 9/2011 | Xu ............................ G06F 11/00 726/23 |
| 8,341,159 | B2 | 12/2012 | Gates |
| 8,370,362 | B2 | 2/2013 | Szabo |
| 8,630,443 | B2 | 1/2014 | Tan et al. |
| 8,667,385 | B1 | 3/2014 | Mui et al. |
| 8,676,799 | B1* | 3/2014 | Vaver ................... G06K 9/6272 707/736 |
| 8,776,234 | B2 | 7/2014 | Doukhvalov |
| 8,887,286 | B2 | 11/2014 | Dupont et al. |
| 8,966,392 | B2 | 2/2015 | Antony et al. |
| 8,996,350 | B1 | 3/2015 | Dub et al. |
| 9,003,023 | B2 | 4/2015 | Crank et al. |
| 9,069,957 | B2 | 6/2015 | Tuvell et al. |
| 9,130,860 | B1 | 9/2015 | Boe et al. |
| 9,229,842 | B2 | 1/2016 | Broda et al. |
| 9,477,758 | B1* | 10/2016 | Tong ..................... G06F 16/951 |
| 2004/0048264 | A1* | 3/2004 | Stoughton ............ C12Q 1/6809 435/6.12 |
| 2005/0146431 | A1 | 7/2005 | Hastings et al. |
| 2007/0038625 | A1 | 2/2007 | Yang-Stephens et al. |
| 2007/0043723 | A1 | 2/2007 | Bitan et al. |
| 2007/0203885 | A1 | 8/2007 | Kim et al. |
| 2007/0213599 | A1 | 9/2007 | Siejko et al. |
| 2007/0294591 | A1 | 12/2007 | Usynin et al. |
| 2008/0244748 | A1 | 10/2008 | Neystadt et al. |
| 2008/0255438 | A1 | 10/2008 | Saidara et al. |
| 2008/0288424 | A1* | 11/2008 | Iyengar ................. G06Q 10/00 706/12 |
| 2009/0150436 | A1 | 6/2009 | Godbole et al. |
| 2009/0276705 | A1* | 11/2009 | Ozdemir ............ G06K 9/00335 715/708 |
| 2009/0292818 | A1* | 11/2009 | Blount ................ G06K 9/00496 709/231 |
| 2010/0077481 | A1 | 3/2010 | Polyakov et al. |
| 2010/0125540 | A1 | 5/2010 | Stefik et al. |
| 2010/0218044 | A1 | 8/2010 | Roblett et al. |
| 2011/0040491 | A1 | 2/2011 | Sontrop et al. |
| 2012/0095943 | A1 | 4/2012 | Yankov et al. |
| 2012/0102053 | A1 | 4/2012 | Barrett et al. |
| 2012/0137367 | A1 | 5/2012 | Dupont et al. |
| 2012/0167218 | A1 | 6/2012 | Poornachandran et al. |
| 2013/0030875 | A1 | 1/2013 | Lee et al. |
| 2013/0055145 | A1 | 2/2013 | Antony et al. |
| 2013/0097103 | A1 | 4/2013 | Chari et al. |
| 2013/0097104 | A1 | 4/2013 | Lu et al. |
| 2013/0111019 | A1* | 5/2013 | Tjew ..................... H04L 43/045 709/224 |
| 2013/0144813 | A1 | 6/2013 | Sengupta et al. |
| 2013/0150684 | A1 | 6/2013 | Cooner |
| 2013/0159348 | A1 | 6/2013 | Mills et al. |
| 2013/0191129 | A1* | 7/2013 | Kurata ..................... G10L 15/04 704/254 |
| 2013/0253898 | A1 | 9/2013 | Meagher et al. |
| 2013/0268889 | A1 | 10/2013 | Barak et al. |
| 2013/0298230 | A1 | 11/2013 | Kumar et al. |
| 2014/0006338 | A1 | 1/2014 | Watson et al. |
| 2014/0035954 | A1 | 2/2014 | Lehavi et al. |
| 2014/0088442 | A1 | 3/2014 | Soykan et al. |
| 2014/0095548 | A1 | 4/2014 | Chen et al. |
| 2014/0096146 | A1 | 4/2014 | Maor et al. |
| 2014/0096249 | A1 | 4/2014 | Dupont et al. |
| 2014/0108401 | A1* | 4/2014 | Namazifar .............. G06F 17/18 707/736 |
| 2014/0114609 | A1 | 4/2014 | Maurer et al. |
| 2014/0129152 | A1* | 5/2014 | Beer ...................... G16B 20/00 702/19 |
| 2014/0129753 | A1 | 5/2014 | Schuette et al. |
| 2014/0143329 | A1* | 5/2014 | Garg ..................... H04L 67/306 709/204 |
| 2014/0149325 | A1 | 5/2014 | Clifton et al. |
| 2014/0258197 | A1 | 9/2014 | Davulcu et al. |
| 2014/0258791 | A1 | 9/2014 | Kew |
| 2014/0280142 | A1 | 9/2014 | Wasson et al. |
| 2014/0343997 | A1 | 11/2014 | Brown et al. |
| 2014/0365527 | A1 | 12/2014 | Fuchs et al. |
| 2015/0088808 | A1 | 3/2015 | Tyagi et al. |
| 2015/0095471 | A1 | 4/2015 | Singh et al. |
| 2015/0193126 | A1 | 7/2015 | Whalley |
| 2016/0162346 | A1* | 6/2016 | Kushnir .............. G06F 11/0709 714/37 |
| 2016/0314255 | A1* | 10/2016 | Cook ..................... G06N 20/00 |
| 2017/0149810 | A1* | 5/2017 | Keshet ................ H04L 63/1425 |
| 2019/0178654 | A1* | 6/2019 | Hare ....................... G06F 16/29 |

FOREIGN PATENT DOCUMENTS

| | | |
|---|---|---|
| IN | 4043/CHE/2014 | 9/2014 |
| KR | 10-2002-0089677 A | 11/2002 |
| KR | 10-2003-0094966 A | 12/2003 |
| WO | 2013/090910 A2 | 6/2013 |

OTHER PUBLICATIONS

Xu, X., A New Sub-topic Clustering Method Based on Semi-supervised Learning, (Research Paper), Oct. 2012, pp. 2471-2478, vol. 7. No. 10.

Xu et al., "Detecting Large-Scale System Problems by Mining Console Logs", ACM Symposium on Operating Systems Principles, 2009, 16 pages.

Wong et al., "Bayesian Network Anomaly Pattern Detection for Disease Outbreaks", Proceedings o/the Twentieth International Conference on Machine Learning (ICML-2003), 2003, pp. 808-815.

Wikipedia, "Levenshtein distance", available online at <https://en.wikipedia.org/wiki/Levenshtein_distance>, retrieved on Oct. 24, 2018, 6 pages.

Thienne Johnson et al., "Network Anomaly Detection Using Autonomous System Flow Aggregates," GLOBECOM 2014—Communication and Information System Security Symposium, 22 pages, Dec. 8-12, 2014.

Taghrid Samak, et al: "Online Fault and Anomaly Detection for Large-scale Scientific Workflows"; 2011; http://dl.acm.org/citation.cfm?id=2058100.

Stata, "Working with categorical data and factor variables", available online at <https://www.stata.com/manuals13/u25.pdf>, 18 pages.

Shebuti Rayana et al, "An Ensemble Approach for Event Detection and Characterization in Dynamic Graphs," 2014 ACM SIGKDD—International Conference on Knowledge Discovery and Data Mining, 10 pages, Aug. 24, 2014.

Robertson, Stephen, "Understanding inverse document frequency: on theoretical arguments for IDF", Journal of Documentation, vol. 60, 2004, pp. 503-520.

(56) References Cited

OTHER PUBLICATIONS

Nor, Igor et al, "Pushy Analytics for IT Operations", 9 pages.
Mori et al., "Term Weighting Method based on Information Gain Ratio for Summarizing Documents retrieved by IR systems", Journal of Natural Language Processing, vol. 9, 2002, 8 pages.
Maguitman, A. et al., Dynamic Extraction of Topic Descriptors and Discriminators: Towards Automatic ContextAL based Topic Search, (Research Paper), Nov. 8-13, 2004.
Madni, A. M. et al.; "Exploring and assessing complex systems behavior through model-driven storytelling"; Oct. 5-8, 2014; 6 pages.
Lee, H., Unsupervised Feature Learning via Sparse Hierarchical Representations, (Research Paper), Aug. 2010, 131 pages.
Landis et al., "The Measurement of Observer Agreement for Categorical Data", Biometrics, vol. 33, No. 1, Mar. 1977, pp. 159-174.
Landesberger, T.V. et al.; "Interaction Taxonomy for Tracking of User Actions in Visual Analytics Applications"; Jun. 30, 2012; 18 pages.
Kim et al., "Baseline Profile Stability for Network Anomaly Detection", International Journal of Network Security, vol. 6, No. 1, Jan. 2008, pp. 60-66.
International Search Report and Written Opinion received for PCT Patent Application No. PCT/US2015/045471, dated May 17, 2016, 7 pages.
International Search Report and Written Opinion received for PCT Patent Application No. PCT/US2015/044478, dated May 9, 2016, 7 pages.
International Search Report and Written Opinion received for PCT Patent Application No. PCT/US2015/020164, dated Dec. 31, 2015, 9 pages.
International Search Report and Written Opinion received for PCT Patent Application No. PCT/US2014/069745, dated Aug. 17, 2015, 10 pages.
International Search Report and Written Opinion received for PCT Patent Application No. PCT/US2014/058852, dated May 27, 2015, 8 pages.
International Search Report and Written Opinion received for PCT Patent Application No. PCT/US2013/039055, dated Jan. 28, 2014, 7 pages.
International Preliminary Report on Patentability received for PCT Patent Application No. PCT/US2015/045471, dated Mar. 1, 2018, 6 pages.
International Preliminary Report on Patentability received for PCT Patent Application No. PCT/US2015/044478, dated Feb. 22, 2018, 6 pages.
International Preliminary Report on Patentability received for PCT Patent Application No. PCT/US2015/020164, dated Sep. 21, 2017, 8 pages.
International Preliminary Report on Patentability received for PCT Patent Application No. PCT/US2014/069745, dated Jun. 22, 2017, 9 pages.
International Preliminary Report on Patentability received for PCT Patent Application No. PCT/US2014/058852, dated Apr. 13, 2017, 07 pages.
International Preliminary Report on Patentability received for PCT Patent Application No. PCT/US2013/039055, dated Nov. 12, 2015, 6 pages.
IBM Security QRadar Log Manager Users Guide, 7.1.0 MR1, IBM. 2012, 2013.
Franc et al., "Learning Detector of Malicious Network Traffic from Weak Labels", ECMLPKDD'15 Proceedings of the 2015th European Conference on Machine Learning and Knowledge Discovery in Databases—vol. Part III, 2015, pp. 85-99.
Forman, George, "BNS Feature Scaling: An Improved Representation over TF-IDF for SVM Text Classification", ACM 17th Conference on Information and Knowledge Management. Napa Valley, CA, Oct. 26-30, 2008, 9 pages.
Filed Patent Application. Filed Jun. 27, 2012, U.S. Appl. No. 13/534,342.
European Search Report and Search Opinion Received for EP Application No. 13883381.9, dated Oct. 7, 2016, 11 pages.
Endert, A. et al.; "Toward Usable Interactive Analytics: Coupling Cognition and Computation"; Jul. 18, 2014; 5 pages.
Dubey, A. et al.; "A Cluster-level Semi-supervision Model for Interactive Clustering"; Jul. 1, 2010; 16 pages.
Cover et al., "Elements of Information Theory", Wiley Series in Telecommunications, 1991, 563 pages.
Bruno, Kurtic ;"New Techniques Detect Anomalies in Big Data"; published: Jan. 21, 2014; Founding Vice President of Product and Strategy, Sumo Logic; http://tdwi.org/Articles/2014/01/21/Detecting-Big-Data-Anomalies.aspx?Page=1.
Ashok Veilumuthu et al. "Intent Based Clustering of Search Engine Query Log," 5th Annual IEEE Conference on Automation Science and Engineering pp. 647-652, Aug. 22-25, 2009.
Aizawa, Akiko, "An information-theoretic perspective of tf-idf measures", Information Processing & Management, vol. 39, Issue 1, Jan. 2003, pp. 45-65.
Aharon et al., "The PARIS Algorithm for Determining Latent Topics", IEEE International Conference on Data Mining Workshops, 2010, pp. 1092-1099.
Aggarwal et al., "A survey of text clustering algorithms", Chapter 4, In Charu C. Aggarwal and Cheng Xiang Zhai, editors, Mining Text Data, 2012, pp. 77-128.
"Detecting Malware with Your Proxy Logs"; Mar. 23, 2013; 3 pages.
"Challenges and Opportunities with Big Data"; Feb. 22, 2012; http://www.purdue.edu/discoverypark/cyber/assets/pdfs/BigDataWhitePaper.pdf.

\* cited by examiner

EVALUATING SYSTEM BEHAVIOUR

BACKGROUND

As computers and computer networks become more prevalent and their impact and reach extends further into everyday life, our dependency upon their secure and stable operation increases. Network security is an issue and it is desired to quickly identify any potentially anomalous and/or dangerous behaviour which may affect the integrity of a computer system and/or network. However, as computer networks continue to evolve and become larger and more complex, this has become an increasingly difficult task.

BRIEF DESCRIPTION OF THE DRAWINGS

Various features of the present disclosure will be apparent from the detailed description which follows, taken in conjunction with the accompanying drawings, which together illustrate various example features, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to systems and methods for evaluating system behaviour. These may be used to monitor behaviour in a multi-entity system such as a computer network. For example, they may be used to automatically identify anomalous behaviour within the system and/or determine the level of disparity between different entities within the system. The system and method may be applied to systems without any prior knowledge of the system behaviour and therefore provide an "out of the box" experience to an end user.

In the examples given below, the method and system referred to are configured to monitor multiple entities on a network. It should be noted, however, that the methods and systems described herein may similarly be used with other types of applications, as would be understood by one of ordinary skill in the art.

Within comparative anomaly detection systems a set of "normal" behaviours for a system under investigation may be explicitly modelled, e.g. parameters may be defined based on knowledge of the system under investigation. Any deviation from the explicitly defined model parameters may be categorized as an anomaly. These comparative systems rely on user or expert knowledge to model the system under investigation, as well as to derive baselines for entity or user behaviour and subsequently identify any deviations from those baselines.

In certain comparative systems, "normal" system behaviour is measured over time, and the deviations are ranked by a system expert based on user-defined criterion. For example, a deviation which may bring about a system shutdown may be ranked as more severe than one that merely slows the system down or decreases its accuracy. One disadvantage of trying to define behavioural baselines is that the systems under investigation are assumed to have a set of static representative behaviours. As such behaviours that change too fast, or at all, over time are not accommodated. However, real-world systems, such as computer networks, are dynamic. Not only may their behaviour change quickly, but it may be unclear what "normal" behaviour is and what features should be used for defining a baseline. In these comparative cases, baselines are thus manually tailored to each domain of operation by a domain expert. In certain cases, a computer system under investigation can change so fast that comparative methods for building a baseline or a classifier for system behaviour are not suitable. For example, in the field of computer security, changes in the system occur at such a rate that by the time an anomaly detection system has been programmed to recognise a certain type of attack, many other new attacks are derived.

In anomaly detection systems that process only numerical data (e.g. signals or time-series data) one approach is to calculate average behaviour as a suitable baseline, and measure any deviations from this behaviour. However, this approach may be difficult to extend to categorical data, wherein it may be no longer clear what "average" behaviour really means.

Given the brief discussion of comparative anomaly detection systems set out above, certain examples described herein provide automatic auto-discovery of anomalies in both static and dynamic system behaviour. This may be performed without using a-priori system knowledge, and/or without deriving expected baselines. These examples therefore may not be restricted to a pre-defined number of possible system behaviours, e.g. as compared to models with parameters that are defined by an engineer with detailed knowledge of the computer system under investigation. As such these examples may be thought of as an "out-of-the-box" solution which may evaluate behaviour of multiple entities within a computer system, e.g. computer or electronic devices that generate streams of data. The entities may each experience a different number of events across multiple features, where each feature may be either categorical (e.g. system status, identity, location or any other non-numerical value) or numerical in nature.

However, it is to be noted that the entities according to the present disclosure are not necessarily electronic devices but can be any entity with comparable behaviour. They are also not limited to physical and/or connected entities. Computer networks provide a convenient example, but the methods and systems described herein may be applied to business intelligence and medical systems, among others. In one implementation, an example entity may be a time period (week, month, year, etc.) and the end user may wish to compare the behaviour of each week to all other weeks under investigation, identifying which week(s) was most abnormal across a certain time-period. In a "software project launch" example, each entity (week) may be characterized by example features such as number of open/closed/rejected/ new bugs, developers working on the release, or severity of different bugs. The features are "truly" categorical, and apply to entities which are not communicating directly between each other.

Another example queries a medical forum of patients that take the same medication for a wide range of sicknesses in order to find the most "abnormal" mismatches between the medication and the sickness. In this example, the entities are the sickness types and the features may be categorical, such as "does the patient have a headache", "male/female" or binned numerical values such as age between "15-20". In the example of network analysis, each transmission has many possible categorical and numerical features, such as the type of protocol used in communication, source and destination port numbers, source and destination IPs, among others. The system and method described herein output a ranking according to a detected abnormal behaviour (without needing to identify what is "normal" first) and further gives a rationalization of the abnormality. This is achieved through the use of cumulative statistical analysis to define and quantify a "statistical distance" between different entities within a system. A statistical distance quantifies the distance between two statistical objects, for example two random variables, two probability distributions, or the distance between an individual sample point and a population or a wider sample of points. They quantify how different two statistical objects, such as probability distributions, are from each other. Statistical distance measures are mostly not metrics and they need not be mathematically symmetrical. Some types of distance measures are referred to as (statistical) divergences which establish the "distance" of one probability distribution to the other on a statistical manifold. In general divergence is not symmetrical, e.g. the divergence from p to q is not equal to the divergence from q to p.

Figure 1:
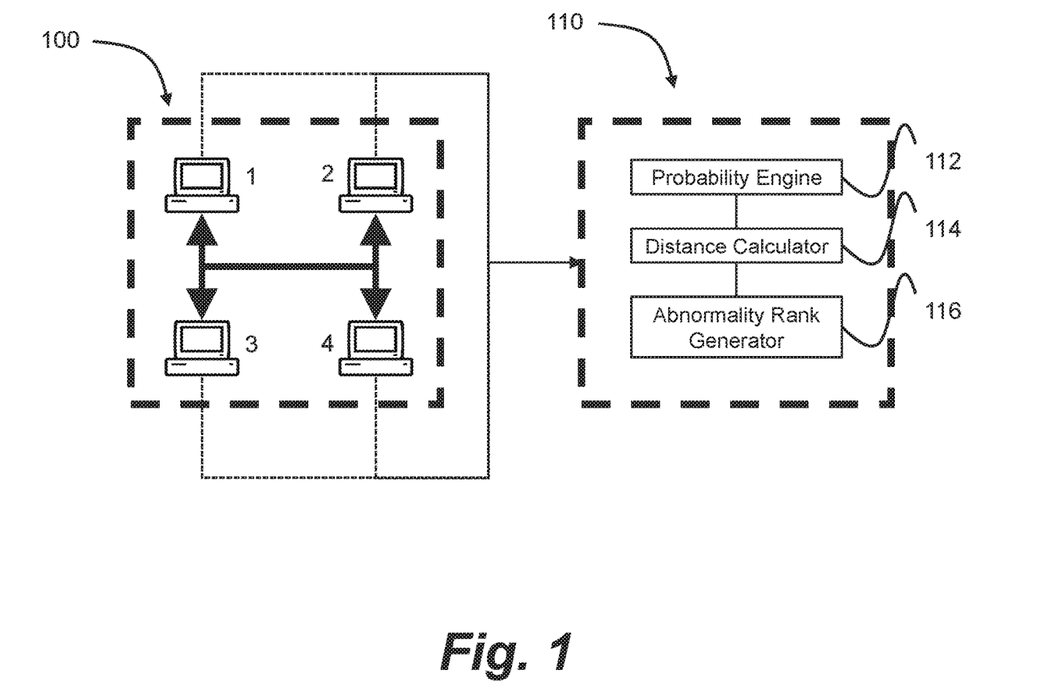
FIG. 1 is schematic diagram of a multi-entity system and an anomaly detection system according an example.

FIG. 1 shows a schematic example of a multi-entity system 100, such as a computer network, comprising multiple entities 1, 2, 3, 4, connected to each other. For example, the entities may be physical devices connected to a network, such as individual computers, printers, servers or terminals, or virtual items such as individual user network sessions, subroutines or programs running on the system. Each may be wholly independent from the others. Each entity comprises at least one feature which is a different characteristic, ability, operation or tool of each entity. Each feature may be categorical and/or numerical in nature, for example relate to one or more of: network traffic, power status, list of programs running, CPU and memory usage, instructions received, or power consumption. In an example, statistical analysis is used to measure entity behaviour by comparing per-entity (and in a further example, per-feature per-entity) histograms derived from recording the event value and frequency of each of the entities (for at least one feature).

An event is an action that occurs at a particular time within the system, detected by the entity that may be handled by the entity. An event may be recorded as a time-stamped data record, said data record comprising at least one data field value relating to a measurement carried out in the entity. Events can be user created, for example pressing a key on the keyboard, using a mouse clicker, moving a mouse etc. Events may also be hardware created, for example timed start-up or shut-down sequences on peripheral devices. Events may also be software/program generated within the system, such as sending or receiving of network packets, interrogation of databases or instructing a connected hardware device. Further examples of events in a telecommunications system include, amongst others creation of a user session, inspection of a data packet or sending an electronic message such as an email or short messaging service message. In a data-center, further examples include an entry on an operating system log for at least one computing device, a message or error dump from a hardware component, or a measurement, such as a power or temperature reading.

FIG. 1 also includes an anomaly detection system 110, investigating the system 100. The system 100 under investigation may be, for example, a local area network, a wide area network, a server hosting virtual machines or a printer cluster. The anomaly detection system comprises a probability engine 112, a distance calculator 114 and an abnormality rank generator 116. The probability engine 112 derives, for a chosen feature, the empirical event probability distribution for each individual electronic device on a network comprising multiple electronic devices. The distance calculator 114 calculates pair-wise statistical distances between each derived probability distribution. Lastly, the abnormality rank generator 116 combines, for each electronic device, the statistical distances to each other electronic devices on the network, and outputs a ranking value based upon the measure of dissimilarity between the empirical event probability distribution data for each device on the network. As such, components of the anomaly detection system 110 may be arranged to carry out the functions of certain examples described herein.

In one case, the probability engine 112 derives the empirical event probability distribution for each individual electronic device across multiple features. In this case, the distance calculator 114 calculates, within each of the multiple features, pair-wise statistical distances between each derived probability distribution. The abnormality rank generator 116 then combines, for each electronic device across multiple features, the statistical distances to each other electronic device on the network, and outputs a ranking value based upon the measure of dissimilarity between the empirical event probability distribution data for each electronic device on the network across all features. In one case, the distance calculator is limited to a maximum value $D_{max}$ for any statistical distance calculated. The upper limit $D_{max}$ may be applied to any statistical distance to overcome computational issues and also normalize the distance between different entities over a particular feature, allowing comparison of distances between different features. It is a global upper-boundary that provides a "worst-case-scenario" (i.e. maximum) statistical difference, thus giving a true measure of entity performance across difference features. In one example, the value of $D_{max}$ is set to be 1. However, other examples may employ different values.

Figure 2:
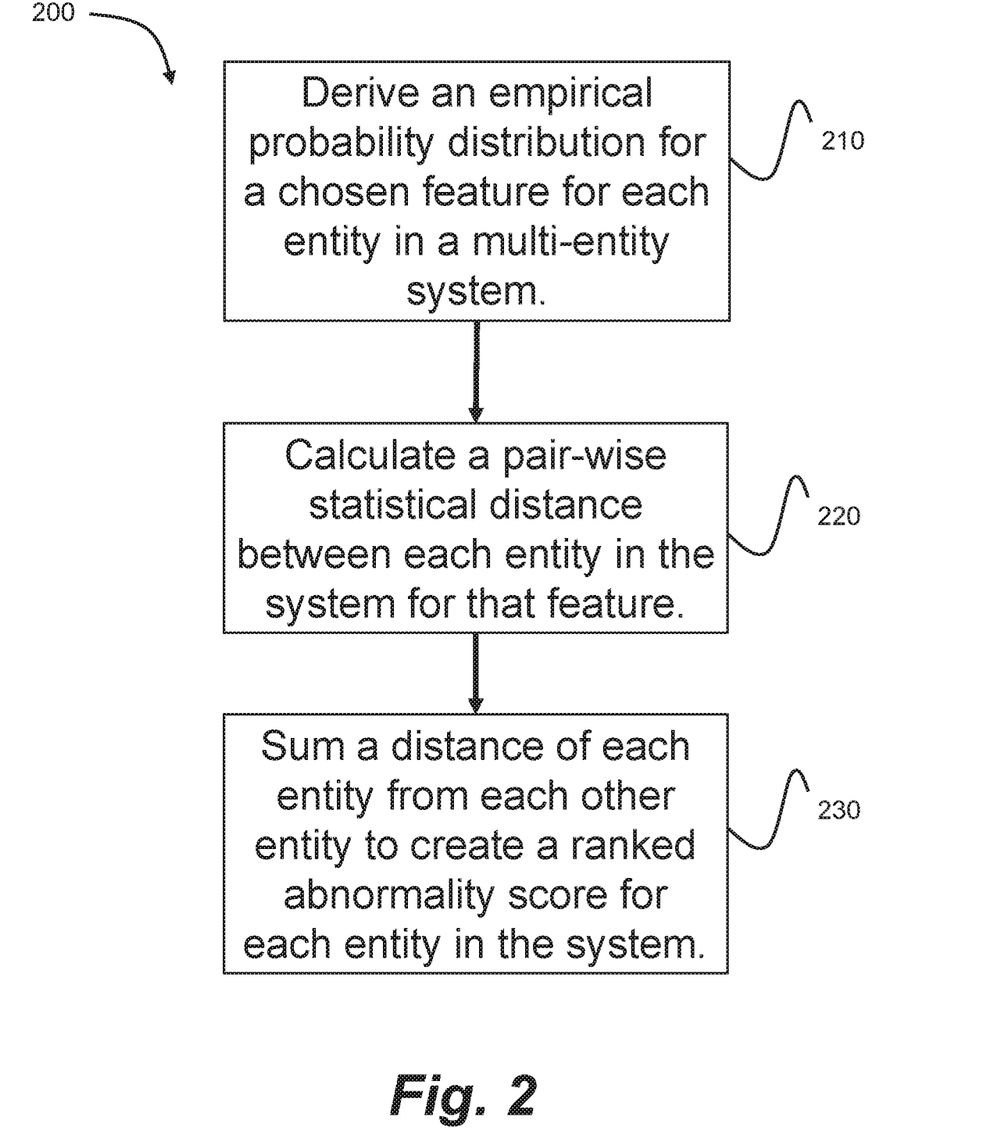
FIG. 2 is a flow-diagram showing a method for evaluating system behaviour according to another example.
Figure 3:
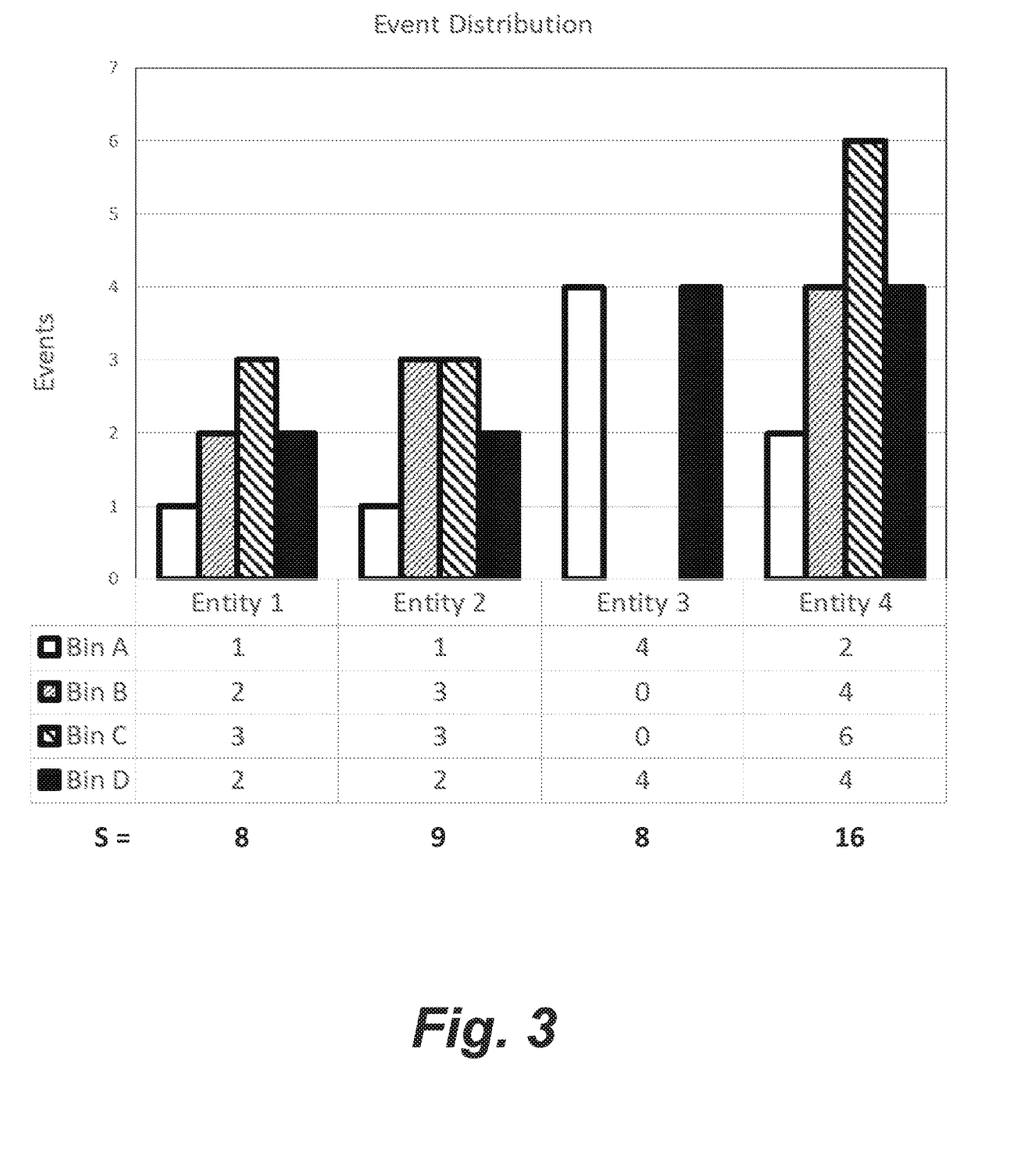
FIG. 3 is a graphical representation of event frequency results according to an example.

FIG. 2 shows a flow chart of a method 200 according to an example. Firstly, for a chosen feature, empirical probability distributions are generated (at 210) from the observed event data for each of the entities within the multi-entity system under investigation. For example, the feature under investigation may be network traffic over time, e.g. each second, and the network traffic per second is recorded and a probability value assigned to each measurable subset of the possible outcomes based on the event value and frequency. The more common an event value, the higher the probability it will occur. FIG. 3 displays example per-entity event data and a corresponding histogram, for a single feature, across a system under investigation 100, where the range of possible event values of the example feature have been classified into four bins, A, B, C, D. The present feature therefore has a "cardinality" of 4 (i.e. number of result bins). The "binning" of the values may be carried out automatically by the behaviour evaluation method according to the range of possible event values observed. In later examples, where each entity may comprise more than one feature, multiple features of different cardinality may be compared and each feature may have a different cardinality. It is to be noted that the events may be categorical and/or numerical in nature. Each bin of event results may encapsulate a different range of values from the others, e.g. for a range of positive discrete values Bin A=0-1, Bin B=2-5, Bin C=6-10, Bin D=10+. For the example where the chosen feature is network traffic, the bins may describe different ranges of kilobytes per second. The bottom row of FIG. 3 labelled "S" represents the total number of events recorded for each entity across all of the event bin ranges, i.e. the event series length.

Figure 4:
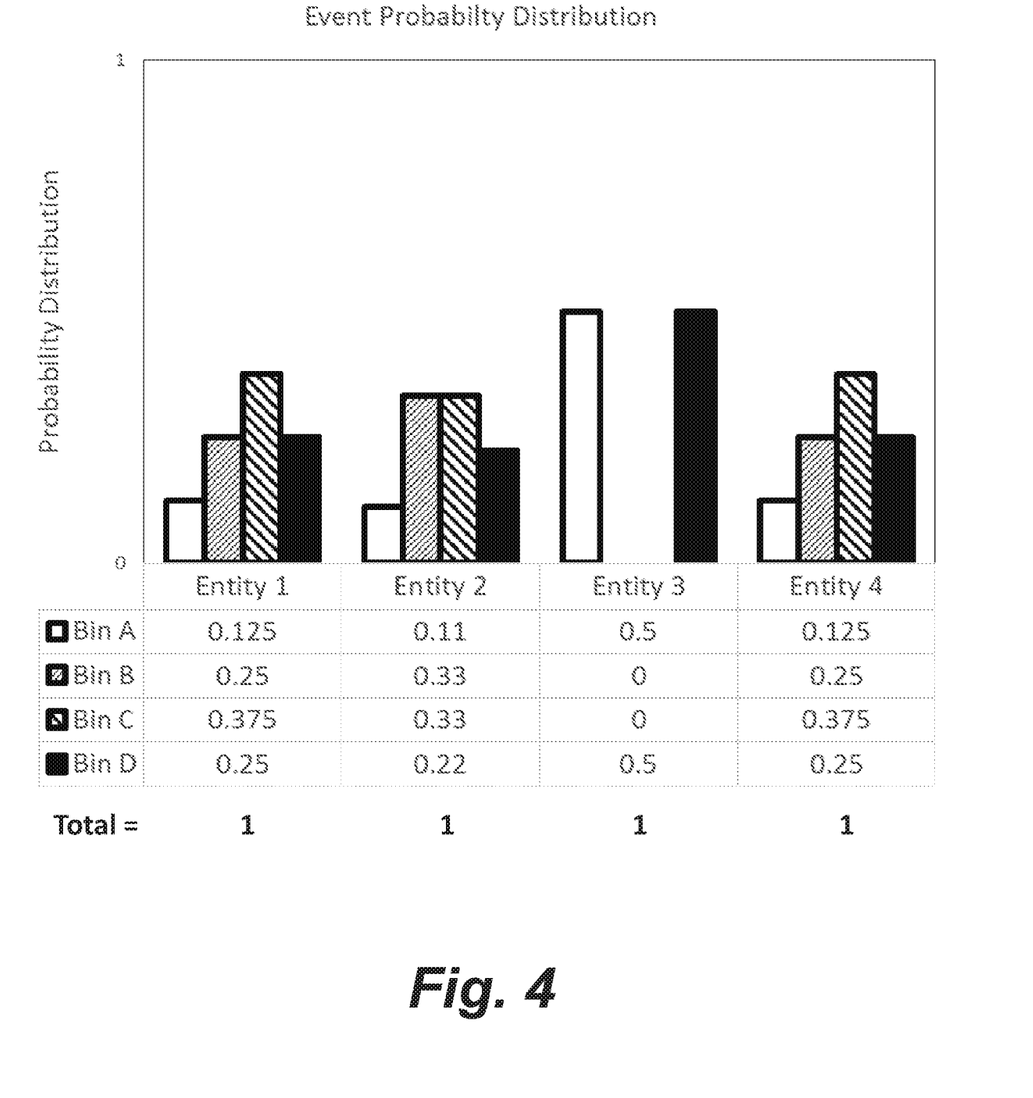
FIG. 4 is a graphical representation of a probability distribution corresponding to the example results shown in FIG. 3.

The empirical probability distribution for the example data shown above is then calculated for each entity, as represented graphically in a histogram in FIG. 4. Even though Entity 4 has recorded twice the number of events as Entity 1, their probability distributions are the same.

Once the empirical probability distribution for each entity in the system has been derived, the next operation is to derive or calculate a pair-wise statistical distance (at 220) between each entity in the system for the chosen feature, preferably in a distance matrix mapping the statistical distance between each entity.

By summing up, for each entity, the distances to each other entity, an overall distance figure can be calculated for each entity. Therefore a ranked distance, or "abnormality score", may be assigned to each entity in the system (at 230), and any outlying entity quickly identified, i.e. the greater the total statistical distance for an entity from the others, the more abnormal its behaviour in the system.

It is to be noted that since many statistical distance (and especially divergence) measures are non-symmetrical, the distance/divergence p→q will likely not be the same as the distance q→p. Both forward and backward (e.g. p→q and q→p) distance values provide their own benefits in calculation and are equally valid. However, in the example method of FIG. 2, the same direction is used in calculations when summing up the distance measurements for a particular entity in the distance matrix, e.g. either across the matrix, or down, as opposed to a mix of the two. Therefore a "one-way" distance may be used in the abnormality score calculation.

The present example therefore provides a tool for "out-of-the-box" interactive behaviour analysis of a system under investigation which may be described by common categorical features, but differ in the way of operation on these features and their combinations, i.e. differ in their behaviour. The tool is able to rank the entities within a system under investigation according to statistical abnormality in their behaviour with respect to all other entities to provide an explanation for ranking and identify entities with similar behaviour within a system under investigation. The method of behaviour evaluation does not require any a-priori knowledge of systems' desired/unwanted/baseline behaviours, but derives the anomalous behaviour automatically, providing an out-of-the-box experience for the tool-user. The tool may be further guided by the tool-user, focusing its analysis on certain features while omitting other features from the analysis.

In one example, the measure chosen to calculate the statistical distance between the entity probability distributions is the Kullback-Leibler (K-L) Divergence. It will be appreciated by the person skilled in the art that other statistical distance measurements may be used.

An example of K-L divergences between each entity is shown below in a distance matrix Table 1.

TABLE 1

| p/q | Entity 1 | Entity 2 | Entity 3 | Entity 4 | Total | Rank |
|---|---|---|---|---|---|---|
| Entity 1 | x | 0.005 | 0.335 | 0.000 | 0.34 | 3 |
| Entity 2 | 0.005 | x | 0.369 | 0.005 | 0.38 | 2 |
| Entity 3 | 0.252 | 0.283 | x | 0.252 | 0.79 | 1 |
| Entity 4 | 0.000 | 0.005 | 0.335 | x | 0.34 | 3 |

Evidence of the non-symmetrical nature of the divergence can be seen as the distance from Entity 1 to Entity 3 is not equal to the distance from Entity 3 to Entity 1. Furthermore, since the probability distribution for both Entity 1 and Entity 4 are the same, their K-L divergence value from each other is zero. As discussed previously, both forward and backward (e.g. p→q and q→p) distance values provide their own benefits in calculation and are equally valid. However, in the present example, the same direction is used in the calculations. In this example the one-way distance is summed across the matrix, i.e. the sum of the distance from a single entity to all other entities in the system. These summed distance values are subsequently ranked, and an abnormality score is produced.

In the above example, it is clear that Entity 3 is the most outlying within the system under investigation, and that Entity 1 and Entity 4 are ranked the same, since their divergence is zero.

Figure 5:
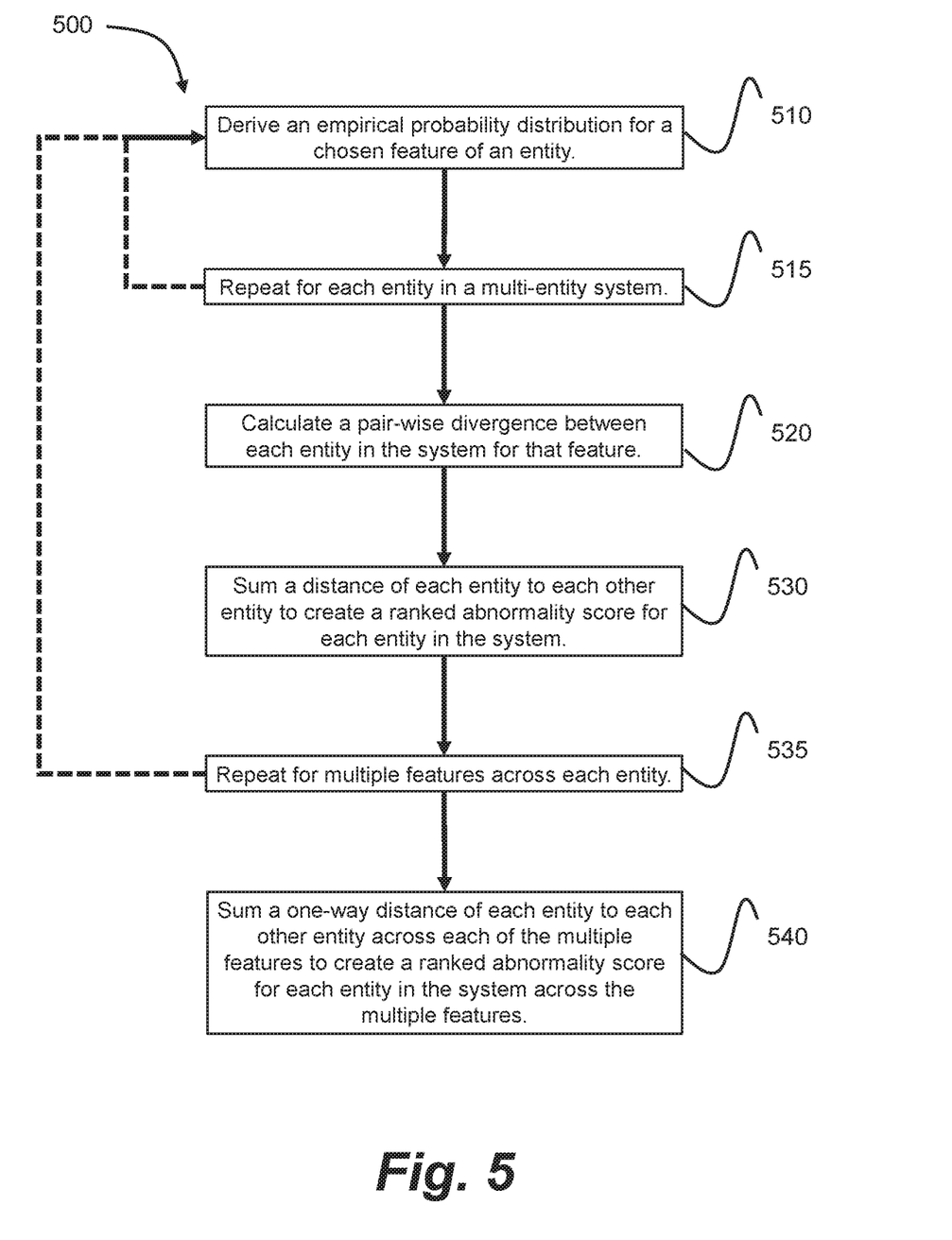
FIG. 5 is a flow-diagram showing a method for evaluating system behaviour according to an example.

FIG. 5 shows an example method 500 that may be used for an entity with more than one feature to be measured and evaluated. In this case, the method comprises deriving an empirical probability distribution of an entity for a chosen feature (at 510), and repeating this block to derive an empirical probability distribution for each entity in the multi-entity system (at 515). Next, a pair-wise statistical distance (in this example divergence) is calculated between the probability distributions calculated for each entity (at 520), and these distances are summed for each entity to create a ranked abnormality score for each entity in the system under investigation (at 530). The previous blocks 510, 515, 520 and 530 are subsequently repeated (at 535) across each entity for each feature in the system. The individual distance scores for each feature are then aggregated to provide an overall abnormality rank for each entity across all features in the system under investigation (at 540).

In this way, a ranked distance, or "abnormality score" may be assigned to each entity in the system for all, and/or each, of its features, and any outlying entity quickly identified. Considering the level of abnormality for each of the features helps rationalize why the entity is abnormal. If a particular per-feature abnormality is high, this feature contributed to total entity abnormality more. This allows the end user to both identify the overall outlying entities within a system, and also the particular feature which is likely causing the abnormal behaviour of an entity.

In one example, the multiple features of entities within a system do not carry equal importance in the overall anomalous behaviour calculation. In order to address this, each of the features may be "weighted" so as to increase or decrease their importance. The weighting of the features may be carried out manually (e.g. by a user) or automatically by the system (e.g. calculated according to the variability, or the peak-ness etc.). A weighting factor is applied to any chosen feature(s) when summing up the cumulative (divergence) distances, per-entity for that feature.

In a further example, individual results within a particular feature may be weighted so that certain event results that are deemed more important than others carry more weight in the empirical probability distribution. For example, any event in Bin A may be deemed more important than the events in Bins B, C or D, and therefore a weighting factor might be applied to the event frequency of Bin A to increase the statistical presence of those events in the empirical probability distribution.

In a further example, a single empirical probability distribution may be derived from the combination of two or more individual features. For example, a single empirical probability distribution may be generated by taking into account a pair of basic features, such as statistics of port protocol and port number, together rather than as two separate features. Therefore abnormalities in pairs may be identified even if each of the individual features do not appear to be behaving irregularly.

In a further example, the probability distribution for each entity is normalised to remove any zero probability values. A zero value in the probability distribution function can cause undesired effects when calculating statistical distances between distributions, such as an infinite K-L divergence value. A simple "plus-1" normalisation, i.e. adding 1 to each event count, would remove any zero results from the probability distribution, and therefore eliminate any infinite K-L divergence values.

In a further example, an upper limit, $D_{max}$, to the K-L value may be used for any pair of probability distributions. In general, there is no upper limit to the divergence, as once $q_i=0$ (without normalisation), the divergence reaches infinity. An example calculation for the upper-limit is described later on.

In a further example, whilst the basic distance measure provides a measure of discrepancy of a certain entity with respect to other entities, a global rarity of certain feature values across multiple systems may be accounted for by up-weighting entities which are not only different in their behaviour, but also use rare features in their already abnormal behaviour. Therefore rarer features will play a larger role in the abnormality score than more common features.

In a further example, and in an effort to reduce the computational time needed to calculate the abnormality score for each entity in the system, the statistical distance calculation may be approximated instead of calculating each entity-to-entity distance value, by employing clustering techniques. In a system of multiple entities, it is expected that some will be closer in behaviour, i.e. more "similar", than others. Carrying out the pair-wise statistical distance measurement for a first entity to each other entity will provide an early indication of the dispersion of the field of entities. Therefore, after carrying out an initial round of statistical distance or divergence calculations for only a single entity to all others, by clustering the entities into sub-groups based upon the initial statistical distance calculations, any subsequent statistical distance calculations can be made between members of the same sub-group/cluster only. Any inter-cluster statistical distance calculations are carried between representative members of the clusters to other cluster representatives. The clustering dramatically reduces the computing time required.

Various methods of clustering may be utilised. In one example, clustering may be performed by employing K-Means clustering. K-Means clustering makes use of a predefined number of clusters which may be chosen in a number of ways. If it is desired for the anomaly detection system to converge to a "real" number of clusters, an initial large K value may be selected, and then all unused clusters may be omitted. Another method is to limit the number of clusters to a number that is computable given the run-time resources of the anomaly detection system.

In a further example, the entities in a system may also be pre-divided into groups of delta and non-delta distributions before being clustered. Delta distributions are zero everywhere except at zero, with an integral of one over the entire real line. They can be thought of as an infinitely high, infinitely thin spike at the origin, with total area one under the spike. In the present context, they may represent those probability distributions which are zero in all bins apart from one, i.e. only one event value is registered (although for one or more events recorded).

Figure 6:
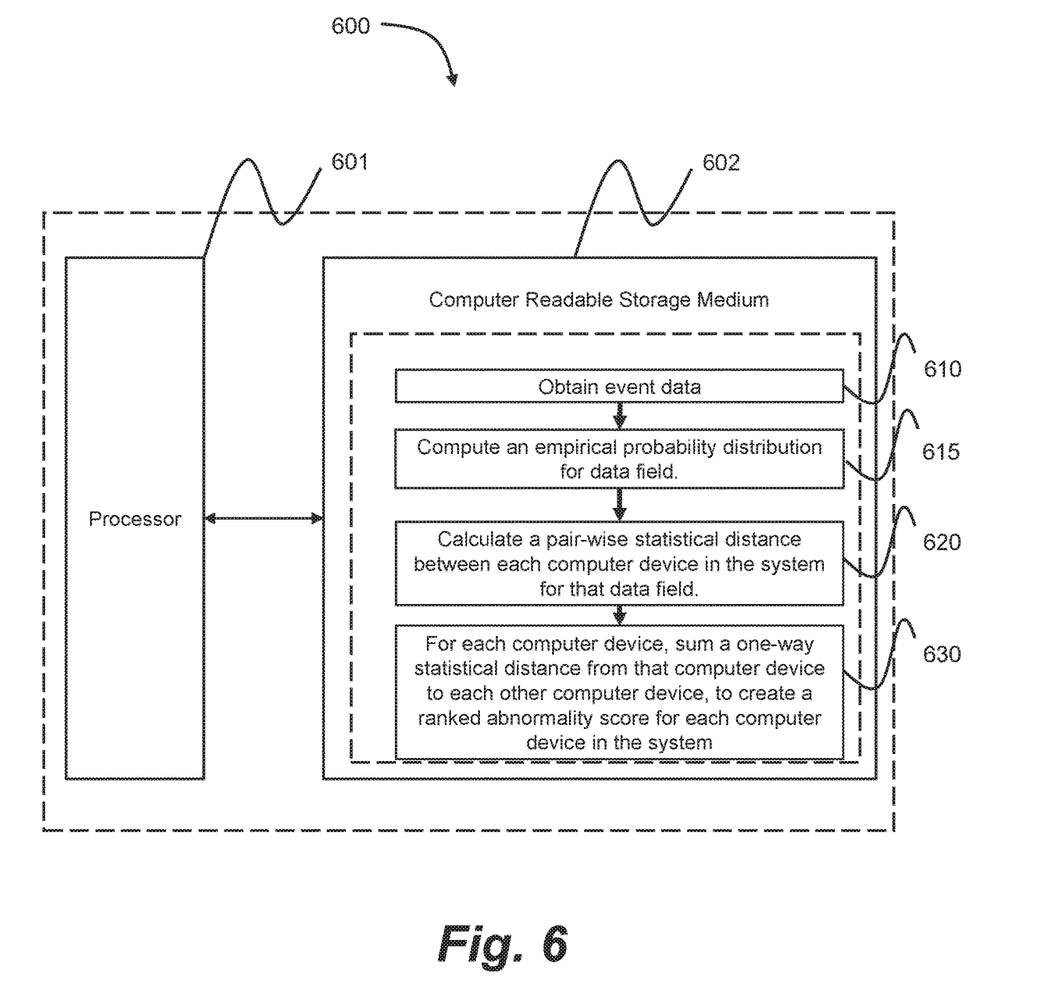
FIG. 6 is a is a schematic diagram showing a computer readable storage medium according to an example.

FIG. 6 shows a computer device 600 comprising a non-transitory computer-readable storage medium 602 storing instructions 610, 615, 620, 630 configured to detect anomalies in a system, e.g. the system 100 in FIG. 1. The computer-readable storage medium 602 may be connected to a processor 601. The computer-readable storage medium 602 may comprise any machine-readable storage media, e.g. such as a memory and/or a storage device. Machine-readable storage media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In one case, the processor 601 may be arranged to store instructions 610, 615, 620, 630 in memory such as RAM to implement the anomaly detection.

The instructions are configured to cause the processor to first, via instruction 610, obtain event data comprising time-stamped data records, said data records comprising at least one data field value relating to a measurement of a computer device in a multi-device system. Via instruction 615, the processor is caused to compute an empirical probability distribution for the at least one data field for each computer device. Instruction 620 is configured to then cause the processor to calculate a pair-wise statistical distance between each computer device in the multi-device system for that data field. Lastly via instruction 630, the processor is instructed to, for each computer device, sum a one-way statistical distance from that computer device to each other computer device, to create a ranked abnormality score for each computer device in the multi-device system. In this case, the summed statistical distance to each other computer device from a particular computer device indicates an abnormal functioning of that computer device within the multi-device system, e.g. the greater the summed distance the more abnormal the functioning of the computer device. As such the instructions implement an example similar to the examples described above.

Further details of certain computations performed in an example method of evaluating system behaviour or an anomaly detection system will now be discussed.

In one example, the empirical probability distributions may be calculated using a definition of empirical probability p:

$$p_i = \frac{c_i}{\Sigma_i c_i}$$

Where $c_i$ is the number of appearances of a value $x_i$ across the range of i (i.e. Bin 1 to Bin 4). The probability is the number of events for a particular value (bin) divided by the total number of events (S). As seen in Table 2 below, and using the example data from FIG. 3 used for Entity 1 only, the (un-normalized) probability distribution for each value of i can be easily understood.

TABLE 2

| Event Counts | Entity 1 | Probability | Entity 1 |
|---|---|---|---|
| Bin A | 1 | Event A | 0.13 |
| Bin B | 2 | Event B | 0.25 |
| Bin C | 3 | Event C | 0.38 |
| Bin D | 2 | Event D | 0.25 |
| S = | 8 | Total | 1.00 |

The probability of an event in Bin A (i="Event A") is the number of events for that range, $c_A=1$, divided by the total number of events, $\Sigma_i c_i=8=(1+2+3+2)$. Therefore $$p_A = \frac{1}{8}.$$

Similarly $$p_B = \frac{2}{8}, p_C = \frac{3}{8} \text{ and } p_D = \frac{2}{8}.$$

These results can be seen in FIG. 4. In an example system under investigation, an example feature might be network traffic, and the method of behaviour analysis would calculate a probability distribution for the rate of data sent over a period of time, therefore identifying the likelihood of a network traffic event to be of a given data rate.

An example of a "plus-1" normalised probability can be expressed as:

$$p_i = \frac{c_i + 1}{\Sigma_i c_i + N}$$

Where N=the cardinality of the range of results, i.e. 4 (Bins A to D) in this example, to ensure the probabilities sum to 1. However, identical standard/un-normalized probability distributions over different series lengths will result in different normalised distributions owing to the difference in the number of events. For example, consider the two following frequency distributions shown below in Table 3:

TABLE 3

| Frequency | Series 1 | Series 2 |
|---|---|---|
| Event A | 1 | 4 |
| Event B | 2 | 8 |
| Event C | 3 | 12 |
| Event D | 2 | 8 |
| Series Length | 8 | 32 |

Since Series 2 has quadruple the number of events as Series 1, but maintaining the same ratios, then the classic probability distribution is the same for both, as shown below in Table 4.

TABLE 4

| Probability | Series 1 | Series 2 |
|---|---|---|
| Event A | 0.13 | 0.13 |
| Event B | 0.25 | 0.25 |
| Event C | 0.38 | 0.38 |
| Event D | 0.25 | 0.25 |
| Total | 1.00 | 1.00 |

However, if we apply the normalised probability equation described above, the different series lengths mean that the probability distributions (shown below in Table 5) between Series 1 and Series 2 are, of course, different owing to the added constants in the normalized probability equation.

TABLE 5

| Probability | Series 1 | Series 2 |
|---|---|---|
| Event A | 0.17 | 0.14 |
| Event B | 0.25 | 0.25 |
| Event C | 0.33 | 0.36 |
| Event D | 0.25 | 0.25 |
| Total | 1.00 | 1.00 |

This will therefore result in a non-zero divergence value, which is undesirable for such distributions. To combat this, and in order to ensure that two (identical when un-normalised) probability distributions maintain a zero divergence value, a further example employs the following normalisation by adding a small normalisation constant $\tilde{\in}$:

$$p_i = \frac{\frac{c_i}{\Sigma_i c_i} + \tilde{\epsilon}}{\frac{\Sigma_i c_i}{\Sigma_i c_i} + N\tilde{\epsilon}} = \frac{c_i + \tilde{\epsilon}\Sigma_i c_i}{\Sigma_i c_i + N\Sigma_i c_i \tilde{\epsilon}} = \frac{c_i + \epsilon}{\Sigma_i c_i + N\epsilon}$$

Here $\in = \Sigma_i c_i \tilde{\in}$, and N=the cardinality of the range of results. $\tilde{\in}$ is a small normalisation constant, and in one example is chosen to be $1/S_{MAX}$, where $S_{MAX}$ is the largest series length for that feature. Therefore, the normalised probability calculation becomes:

$$p_i = \frac{c_i \frac{S_{MAX}}{S} + 1}{S_{MAX} + N} = \frac{c_i + \frac{S}{S_{MAX}}}{S + N\frac{S}{S_{MAX}}}$$

Figure 7:
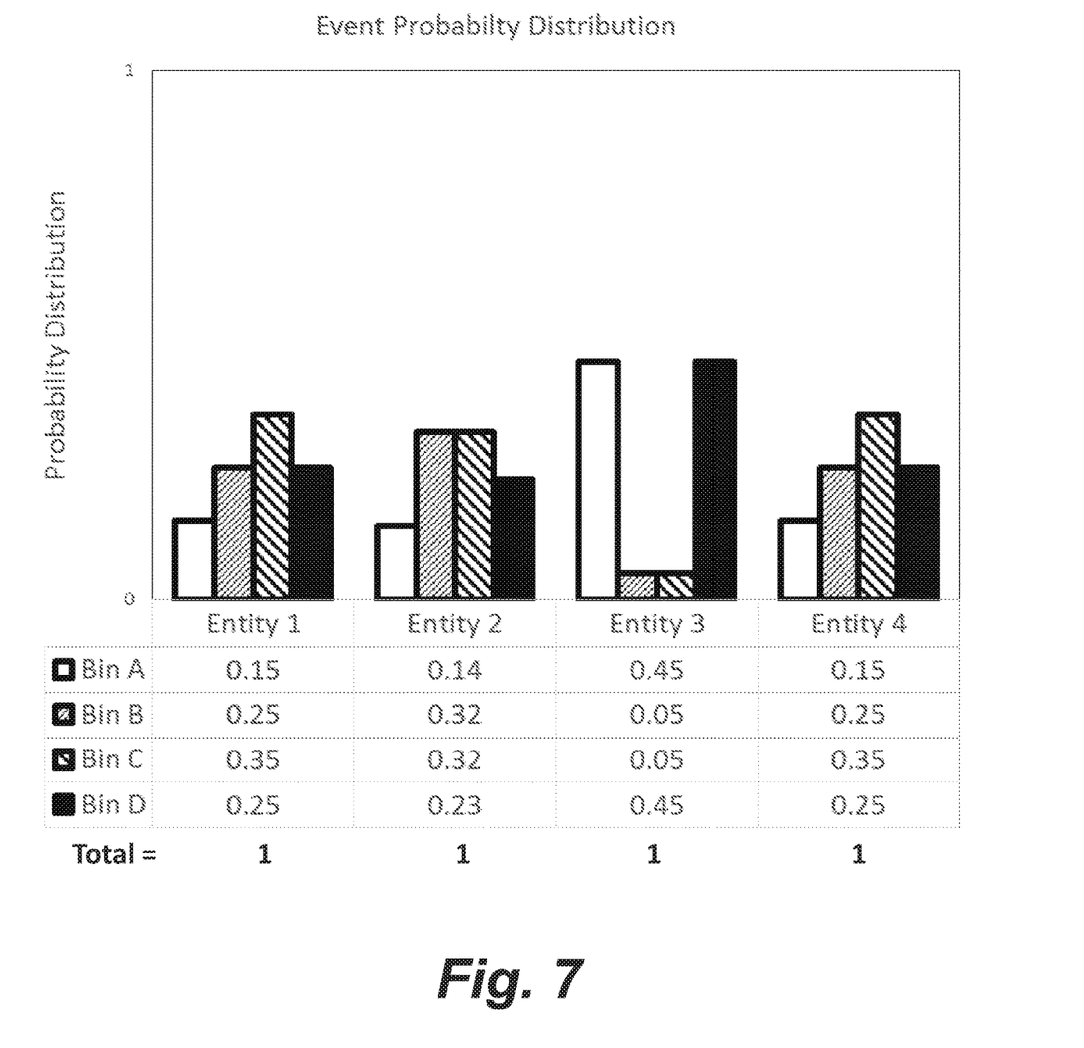
FIG. 7 is graphical representation of an example of a normalised version of the probability distribution shown in FIG. 4.

Incorporating the above calculations into our original example results, the empirical probability distribution for the example system becomes that shown in FIG. 7. As can be seen, the zero values have been successfully removed by the normalisation, and Entity 1 and Entity 4 have maintained their identical distributions. Therefore the divergence measure between Entity 1 and Entity 4 will be zero.

The Kullback-Leibler divergence may calculated by:

$$D(p \parallel q) = \sum_i p_i \log \frac{p_i}{q_i}$$

The cumulative per-feature divergence measurement for an "Entity a" to all other entities b in the system, across multiple features F, may be described by:

$$CumDiv_a(F_j) \overset{\Delta}{=} \sum_b Div_{a,b}(F_j)$$

When calculating the average distance of an entity from all others, and taking into account weighting of certain features across all features, the calculation of the average distance from "Entity a" to all others in the system becomes:

$$Dist(a, L\backslash a) = \frac{\sum_{j \in C} W(F_j) CumDiv_a(F_j)}{\sum_{j \in C} W(F_j)}$$

i.e., the sum across all features of the weighted W (for each feature) divergence from "Entity a" to each other entity in the system, divided by the sum of the feature weights.

However, this method is biased towards "richer" feature histograms, and divergence is expected to be higher for a feature with a smaller number of possible values per feature. Whilst these features could be further weighted, which would require additional effort and user input, instead an upper-bound, $D_{max}$, may be calculated for the divergence for each feature. Incorporating this value into the above equation and normalising, the following computation may be used:

$$Dist(a, L\backslash a) = \frac{\sum_{j \in C} W(F_j) \frac{CumDiv_a(F_j)}{D_{max}(F_j)}}{\sum_{j \in C} W(F_j)}$$

This normalization provides two useful features. It both implicitly accounts for statistical validity of approximation used in calculating the empirical probability distributions, and brings all the features to a common base. Moreover, for every feature, for every entity, the L (the number of entities) values of $Div_{.,.}(F_j)$ are summed. This adaptation allows a ranking of the entities by their average distance from every other entity, and also a scoring between 0-1 that provides not only the rank of each entity but also its anomaly level. To achieve this a distance metric may be normalized by L, obtaining:

$$Dist_{norm}(a, L\backslash a) = \frac{1}{L} \cdot Dist(a, L\backslash a) = \frac{1}{L} \cdot \frac{\sum_{j \in C} W(F_j) \frac{CumDiv_a(F_j)}{D_{max}(F_j)}}{\sum_{j \in C} W(F_j)}$$

The cumulative divergence measure per-feature per-entity can be used to rank the features; the higher the cumulative divergence for that feature, the more likely it is to be the cause of anomaly for a particular entity.

An upper limit, $D_{max}$ may be imposed upon the divergence $D(p\|q)$ as follows:

$$D(p\|q) \leq \log\left(\frac{1}{\tilde{\in}} + N\right)$$

N=the cardinality of the range of results and $\tilde{\in}$ is a small normalisation constant. In one example is chosen to be $1/S_{MAX}$ where $S_{MAX}$ is the largest series length for that feature.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the embodiments, or any combination of any other of the embodiments.

What is claimed is:

1. A method of evaluating system behaviour, comprising:
   for each entity in a multi-entity system, deriving an empirical probability distribution for a feature,
   calculating a pair-wise statistical distance between each entity in the system for the feature,
   for each entity, summing the statistical distances to each other entity to create a ranked abnormality score for each entity in the system, and
   applying an upper bound to the statistical distance for the feature between any two entities in the system, such that the upper bound is equal to $\log((1/\tilde{\in})+N)$, wherein $\tilde{\in}$ is equal to $1/S_{MAX}$, wherein $S_{MAX}$ is the maximum number of events in any probability distribution for that feature across all entities, and N is the cardinality of the probability distribution for the feature.

2. The method according to claim 1, further comprising:
   deriving an empirical probability distribution for multiple features for each entity in the multi-entry system,
   calculating a pair-wise statistical distance between each entity in the system for each feature of the multiple features,
   for each feature of the multiple feature, summing the statistical distances to each other entity to create a ranked abnormality score for each entity in the system, and
   for each entity, summing the cumulative statistical distance to each other entity across each of the multiple features to create a ranked abnormality score for each entity in the system across the multiple features.

3. The method according to claim 2, further comprising:
   weighting the pair-wise statistical distance values for a chosen feature in order to provide a weighted sum across all features for each entity.

4. The method according to claim 2, wherein the features are weighted automatically to increase contribution of probability distributions from rarer features.

5. The method according to claim 1, further comprising:
   weighting individual event results within the empirical probability distribution for the feature.

6. The method according to claim 1, further comprising:
   normalizing each probability distribution for the feature to be non-zero.

7. The method according to claim 6, further comprising:
   achieving the normalization by adding a non-zero constant $\tilde{\in}$ to each original empirical probability value, wherein
   the non-zero constant $\tilde{\in}$ is $1/S_{MAX}$, and
   $S_{MAX}$ is the maximum number of events in any probability distribution for the feature across all entities, and further normalizing the probability distribution over N so that all probabilities sum to 1, wherein N is the cardinality of the probability distribution for the feature.

8. The method according to claim 1, further comprising: utilizing the Kullback-Leibler divergence measure to calculate the statistical distance.

9. The method of claim 1, comprising:
after carrying out an initial round of statistical distance calculations from a single entity to all other entities,
clustering the entities according to the initial statistical distance calculated between one entity to each other entity for the feature,
calculating further feature statistical distances between entity members of the same cluster only, and
calculating inter-cluster statistical distances between cluster representatives only.

10. The method according to claim 9, further comprising:
pre-clustering the probability distributions into delta and non-delta clusters.

11. An anomaly detection system comprising:
a probability engine to derive the empirical event probability distribution for each individual electronic device on a network comprising multiple electronic devices for a plurality of features;
a distance calculator to calculate, for each feature of the plurality of features, pair-wise statistical distances between each derived probability distribution; and
an abnormality rank generator to
combine, for each electronic device across each feature of the plurality of features, the statistical distances to each other electronic devices on the network, and
output a ranking value based upon the measure of dissimilarity between the empirical event probability distribution data for each device on the network, wherein the ranking value is across all features.

12. The system according to claim 11, wherein:
the distance calculator is limited to a maximum value $D_{max}$ for any statistical distance calculated.

13. A non-transitory machine readable storage medium comprising instructions which, when loaded into memory and executed by at least one processor of an anomaly detection system, cause the processor to:
for each computer device in a multi-device system, obtain event data comprising time-stamped data records, said data records comprising at least one data field value relating to a measurement of the computer device;
compute an empirical probability distribution for the at least one data field for each computer device,
normalize each empirical probability distribution to be non-zero, wherein the normalization comprises:
adding a non-zero constant $\in$ to each empirical probability distribution value, wherein the non-zero constant $\in$ is $1/S_{MAX}$, and $S_{MAX}$ is the maximum number of events in any probability distribution for the data field value across all entities, and
normalizing the probability distribution over N so that all probabilities sum to 1, wherein N is the cardinality of the probability distribution for the data field,
calculate a pair-wise statistical distance between each computer device in the multi-device system for that data field, and
for each computer device, sum a one-way statistical distance from that computer device to each other computer device, to create a ranked abnormality score for each computer device in the multi-device system, whereby the summed statistical distance to each other computer device from a particular computer device indicates any abnormal functioning of that computer device within the multi-device system.

* * * * *